US009569255B1

(12) United States Patent
Johnson et al.

(10) Patent No.: US 9,569,255 B1
(45) Date of Patent: Feb. 14, 2017

(54) PERSISTENT STATE MACHINE

(71) Applicant: Amazon Technologies, Inc., Seattle, WA (US)

(72) Inventors: Pierce Butler Johnson, Seattle, WA (US); Joseph Allan Mifsud, Seattle, WA (US); Thomas Jeffrey Rothwell, Seattle, WA (US); Vaibhav Jain, Seattle, WA (US); Matthew Alexander Mitgang, Seattle, WA (US); Joseph Carl Fant, IV, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/668,777

(22) Filed: Mar. 25, 2015

(51) Int. Cl.
| | |
|---|---|
| *G06F 9/46* | (2006.01) |
| *G06Q 10/00* | (2012.01) |
| *G06Q 30/00* | (2012.01) |
| *G06F 15/173* | (2006.01) |
| *G06F 9/48* | (2006.01) |
| *G06F 9/54* | (2006.01) |
| *G06Q 30/06* | (2012.01) |
| *G06F 9/50* | (2006.01) |

(52) U.S. Cl.
CPC . *G06F 9/48* (2013.01); *G06F 9/46* (2013.01); *G06F 9/466* (2013.01); *G06F 9/485* (2013.01); *G06F 9/4806* (2013.01); *G06F 9/4843* (2013.01); *G06F 9/4881* (2013.01); *G06F 9/4887* (2013.01); *G06F 9/50* (2013.01); *G06F 9/5005* (2013.01); *G06F 9/5011* (2013.01); *G06F 9/5027* (2013.01); *G06F 9/5038* (2013.01); *G06F 9/542* (2013.01); *G06Q 30/06* (2013.01); *G06Q 30/0601* (2013.01); *G06Q 30/0641* (2013.01); *G06Q 30/0643* (2013.01)

(58) Field of Classification Search
None
See application file for complete search history.

(56) References Cited

U.S. PATENT DOCUMENTS

| | | | | |
|---|---|---|---|---|
| 2003/0115073 | A1* | 6/2003 | Todd | G06Q 30/06 705/1.1 |
| 2006/0059107 | A1* | 3/2006 | Elmore | G06Q 10/06 705/64 |
| 2007/0100765 | A1* | 5/2007 | Naganuma | G06Q 10/06 705/59 |
| 2008/0127205 | A1* | 5/2008 | Barros | G06Q 10/10 719/313 |

(Continued)

*Primary Examiner* — Charles Swift
(74) *Attorney, Agent, or Firm* — Sutherland Asbill & Brennan LLP

(57) ABSTRACT

A workflow for a work item may be executed using an on-device persistent state machine-based architecture. The on-device state machine-based architecture may include a state machine manager that executes the workflow in accordance with a state machine that includes multiple states corresponding to stages of execution in the workflow. Each state in the state machine is associated with one or more tasks to be executed in connection with that state. The state machine further specifies one or more state transitions for each state of the state machine. A state transition associated with a particular state indicates a next state to transition to from the particular state upon completion of the one or more tasks associated with the particular state.

20 Claims, 7 Drawing Sheets

(56) References Cited

U.S. PATENT DOCUMENTS

| | | | |
|---|---|---|---|
| 2011/0219375 A1* | 9/2011 | Chang | G06F 9/46 718/100 |
| 2012/0030094 A1* | 2/2012 | Khalil | G06Q 10/06 705/39 |
| 2012/0137307 A1* | 5/2012 | Sarferaz | G06Q 10/10 719/317 |
| 2014/0279764 A1* | 9/2014 | Lahr | G06F 9/5038 706/12 |
| 2015/0026056 A1* | 1/2015 | Calman | G06Q 20/3223 705/42 |
| 2016/0034843 A1* | 2/2016 | Costello | G06Q 10/087 705/7.15 |

* cited by examiner

PERSISTENT STATE MACHINE

BACKGROUND

Web browsers or applications designed for execution on mobile devices may encounter a failure (e.g., may crash) during a multi-device transaction (e.g., after selecting an item for purchase but before completing the purchase). When this happens, the user may need to initiate the transaction from an initial starting point after re-launching the web browser or dedicated application because transaction data generated prior to the crash may not have been persisted. The inventions described below are improvements in technology that enable, among other things, a better user experience.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
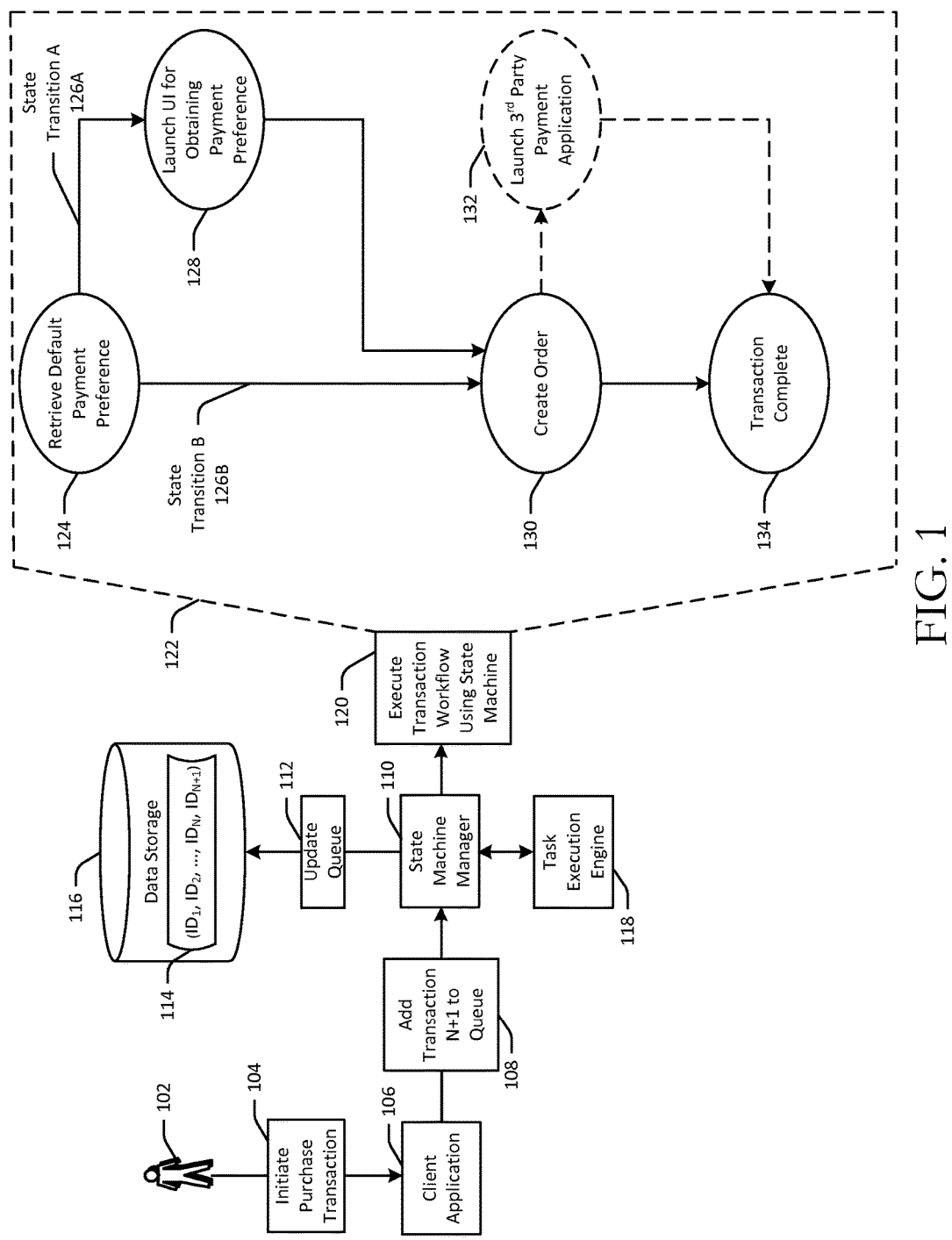
FIG. 1 is a schematic hybrid system, process, and data flow diagram illustrating execution of an example workflow for a purchase transaction using a persistent on-device state machine-based architecture in accordance with one or more example embodiments of the disclosure.

This disclosure relates to, among other things, systems, methods, computer-readable media, techniques, and methodologies for executing a workflow for a work item using an on-device persistent state machine-based architecture. The state machine may include multiple states that correspond to stages of execution in the workflow. Each state in the state machine may be associated with one or more tasks to be executed in connection with that state. The state machine may further specify one or more state transitions for each state of the state machine. A state transition associated with a particular state may indicate a next state to transition to from the particular state upon completion of the one or more tasks associated with the particular state. Multiple state transitions may be associated with a particular state such that each state transition may specify a corresponding next state to transition to from the particular state. A client application/process/program may define the structure of the state machine including the number and type of states and the state transitions between states. Further, the client application/process/program may specify the task(s) to be completed in connection with each state. The term client application, as used herein, may include a client process, a client program, or the like.

In certain example embodiments, a work item object may be generated. The work item object may be, for example, a JAVA™ object representative of a work item to be completed. The work item object may include an indication of a current execution state of a workflow for the work item as well as a data object that includes metadata associated with the work item. The metadata may include, for example, data indicating a state transition along which the workflow execution should proceed from the current execution state, data obtained from user input provided to a client application, system-generated data, and so forth. The work item may be, for example, a multi-device data transaction, a data storage and/or retrieval transaction, or the like. More generally, a work item may include a set of tasks to be performed in accordance with a workflow execution that includes a set of workflow states, where the outcome of one or more tasks performed in connection with a given workflow state may determine the next state in the workflow execution, and thus, the next one or more tasks to be performed.

A work item object identifier may be generated and associated with the work item object, and the work item object identifier may be added to a work item queue. The work item queue may include a collection of ordered work item object identifiers, with each identifier corresponding to a respective work item object representative of a corresponding work item. The work item queue may be a first-in-first-out (FIFO) queue in which a new work item object identifier is enqueued to a rear terminal position of the queue and a work item object corresponding to a completed work item is dequeued from a front terminal position of the queue. If the work item queue is a FIFO queue, a workflow for a work item object corresponding to the first work item object identifier enqueued may be executed prior to workflows for work item objects corresponding to other work item object identifiers included in the queue. It should be appreciated that a FIFO queue is merely an example and that the work item queue may be a last-in-first-out (LIFO) queue, a priority queue, or the like. It should further be appreciated that the work item queue may be implemented as any suitable data structure including, but not limited to, a linked-list, a circular buffer, or the like.

The work item object identifier may be enqueued to a work item queue stored in persistent data storage of a user device as well as to a work item queue stored in memory of the user device. The persistent data storage may include, for example, non-volatile storage such as hard disk storage, read-only memory (ROM), flash memory, ferroelectric random access memory (FRAM), or the like. The memory may include, for example, volatile storage such as various forms of random access memory (RAM). In certain example embodiments, the work item object identifier may be enqueued to a work item queue stored in persistent data storage and that work item queue may be read from the persistent data storage and written to memory prior to initiating execution of a workflow for the work item object corresponding to the work item object identifier.

The work item object may be stored in the persistent data storage and the memory of the user device as well. In certain example embodiments, a client application may provide a data model that specifies how the work item object is to be stored. Each work item object identifier and corresponding work item object may be stored, for example, as a key-value pair. As a non-limiting example, the work item objects and corresponding work item object identifiers may be stored as a JavaScript Object Notation (JSON) object with each element in the JSON object being a key-value pair containing a particular work item object identifier and a corresponding work item object. The JSON object may be stored in both persistent data storage of the user device and memory of the user device. When a new work item object is generated, it may be stored in association with the corresponding work item object identifier as a new element of the JSON object. It should be appreciated that JSON objects and key-value pairs are discussed above merely as example data models/structures for storing a work item object in association with its corresponding work item object identifier. Any suitable data structure for representing an abstract data type (e.g., an associative array, map, symbol table, etc.) composed of a collection of key-value pairs may be used.

As previously noted, a workflow may be executed for a work item using an on-device persistent state machine-based architecture. A state machine manager may be instantiated and may send a build command to a state machine builder to construct the state machine to be used as part of executing the workflow. In an object-oriented programming language, the state machine manager may be instantiated by creating a state machine manager object. In a class-based object-oriented programming language, for example, the state machine manager object may be created by making a call to a subroutine such as constructor specified for a state machine manager class. The state machine manager class may be an extensible program-code-template for creating state machine manager objects, providing initial values for member variables, and implementations of behavior of state machine objects (e.g., member functions). A state machine manager object created as a result of a call to a constructor of the state machine manager class may be referred to as an instance of the state machine manager class. As another non-limiting example, in a prototype-based programming language, a state machine manager object may be instantiated by copying an existing state machine object that serves as a prototype. It should be appreciated that any component described herein as being instantiated may be instantiated in accordance with mechanisms similar to those described above in relation to the state machine manager.

The state machine builder may construct the state machine based on a state machine definition that defines the states included in the state machine and the state transitions between states. The state machine manager may retrieve the stored work item object corresponding to the work item using the associated work item object identifier. The state machine manager may then determine the current workflow execution state stored in the work item object. The current execution state may correspond to a particular state of the state machine. At an initial execution stage of the workflow, the current execution state may correspond to an initial state of the state machine.

A client application may make a call to the state machine manager to initiate execution of the workflow for the work item. For example, the client application may call a routine, subroutine, procedure, function, or the like that may cause a sequence or set of program instructions to be executed to cause the state machine manager to initiate execution of the workflow for the work item. As used herein, the term function encompasses a routine, subroutine, procedure, or any other sequence or set of program instructions that causes one or more operations to be performed when executed. The client application may include any suitable client application, program, or process including, but not limited to, a web browser, a web-based application, a desktop or laptop application, a mobile web browser, a dedicated mobile application, or the like. In response to the function call, the state machine manager may determine the current execution state (as described above), and may further determine a task object factory to select for generating a task object corresponding to a task to be completed in connection with the current execution state. The state machine manager may provide the work item object identifier and metadata stored in the corresponding work item object to the task object factory. The task object factory may utilize this information to instantiate a task object corresponding to the task to be executed in connection with the current execution state. In certain example embodiments, the task object factory may generate multiple task objects for a given state of the state machine, with each task object corresponding to a particular task to be performed in connection with that state. Further, in certain example embodiments, a different task object factory may be provided for generating task object(s) for each state of the state machine. In this manner, a task object factory may not need to be aware of the current execution state of the workflow in order to generate the appropriate task object(s) for that state. For example, a client application may implement the interface that defines the operation of a task object factory, and thus, the client application may not need to be aware of the current execution state of the workflow in order for appropriate task(s) to be completed in connection with the current execution state.

After generating a task object, the task object factory may provide the task object to a task execution engine configured to execute the task object. Execution of a task object may be described herein interchangeably as execution of a task corresponding to the task object. Upon completion of execution of the task object, the task execution engine may generate a task completion event. Further, an interface for the task execution engine may define functions that may be called upon completion of a task. For example, a send function may be called when a task is completed without generating an exception and a sendException function may be called when an exception occurs during execution of a task. Depending on whether an exception occurs during execution of a task, either the send function or the sendException function may be called. The function that is called may be passed the task completion event generated upon completion of the task and the work item object identifier as parameters.

As a result of the function call, the client application may receive the task completion event and the work item object identifier and forward this information to the state machine manager along with an instruction to continue execution of the workflow based on the task having been completed. The instruction may include an indication of whether the task was completed with or without an exception. Upon receiving this instruction, the state machine manager may determine the state transition that corresponds to completion of the task and transition the workflow to a next state in the state machine based on the determined state transition. In other example embodiments, the state machine manager may receive the task completion event and the corresponding work item object identifier directly from the task execution engine. For example, calling the send function or the sendException function may result in the task completion event and the work item object identifier being sent from the task execution engine to the state machine manager.

Upon determining the state transition and the next state, the state machine manager may update the stored work item object to indicate that the next state is the current execution state for the workflow and/or may update the metadata stored in the work item object. The work item object stored in the persistent data storage and/or the work item object stored in the memory may be updated. The state machine manager may then determine a task object factory to select for generating a task object corresponding to a task to be completed in connection with the next state of the state machine (which is now the current execution state). Upon determining the appropriate task object factory, the state machine manager may provide the work item object identifier and work item object metadata to the task object factory to enable the task object factory to generate an appropriate task object. The workflow execution may then continue as described above.

In certain example embodiments, multiple tasks may be associated with a given state of the state machine. In such example embodiments, upon receiving a task completion event indicating completion of a first task associated with a particular state, the state machine manager may provide the work item object identifier and metadata associated with the completed first task to a task object factory which may, in turn, generate a second task object corresponding to a second task to be completed in connection with the particular state. In certain example embodiments, the second task may be determined based on whether the first task was completed with or without an exception. In this manner, tasks associated with a given state of the state machine (e.g., a current execution state in the workflow) may be serially executed until a state transition to a next state occurs.

Further, in certain example embodiments, completed tasks may include synchronous tasks and/or asynchronous tasks. An asynchronous task may be a task for which the task execution engine does not generate a task completion event upon completion of the task. Rather, the task completion event may be generated and conveyed to the state machine manager asynchronously from execution of the task by the task completion engine. An example of an asynchronous task may include a task that requires user interaction prior to initiating a state transition to a next state. For example, the task execution engine may not generate a task completion event for the launching of a user interface element (e.g., a widget). Rather the task completion event may be generated asynchronously after the user interacts with the widget and the widget is completed or exited. An example of a synchronous task may include a server call that returns a value. Upon receipt of the value, a task completion event may be generated.

The work item queue and associated work item objects may be stored in persistent data storage in response to various triggering events. For example, as previously described, in response to an enqueue instruction received from a client application, the state machine manager may generate (or receive from the client application) a work item object and a corresponding work item object identifier for the new work item, may update the work item queue stored in persistent data storage of the user device to include the new work item object identifier, and may further store the new work item object in the persistent data storage in association with the corresponding work item object identifier. The state machine manager may perform similar operations in response to a dequeue instruction received from the client application and/or upon completion of a task that results in a state transition to a next state of the state machine as part of the workflow execution.

In certain example embodiments, the workflow execution for a work item may halt due to the occurrence of a failure event. A failure event may include, for example, a crash event associated with the client application, a failure event on the user device on which the client application is executing that causes the client application to cease functioning in an expected manner, a reboot of the user device, and so forth. After a failure condition created by the occurrence of a failure event is no longer present (e.g., a client application is launched again after crashing), a queue retrieval engine may be instantiated. The client application may then make a call to the queue retrieval engine to access the work item queue stored in the persistent data storage and load the work item queue into device memory. In addition, the queue retrieval engine may determine a work item object identifier associated with work item object whose workflow execution was halted (e.g., the first work item object identifier in the queue), and may use the work item object identifier to retrieve the corresponding work item object from the persistent data storage and store the work item object in memory. As part of the call to the queue retrieval engine, the client application may pass in i) a state machine definition that identifies the states of the state machine and the state transitions between states, ii) the task execution engine interface, and iii) a data model that defines a structure for how work item objects are stored in data storage as parameters.

The queue retrieval engine may then create an instance of the state machine manager and provide the instance of the state machine manager (or an indication thereof) to the client application. In response to an instruction from the client application, the state machine manager may resume execution of the workflow for the work item corresponding to the retrieved work item object. In particular, the state machine manager may instruct a state machine builder to construct the state machine based on the state machine definition. The state machine manager may also determine the current execution state stored in the work item object, which is the state at which the workflow execution was halted, and may continue the workflow execution at the current execution state. In particular, the state machine manager may determine a task object factory to select for generating a task object for a task to be executed in connection with the current execution state, and may provide the work item object identifier and metadata associated with the work item object to the task object factory. The task object factory may instantiate a task object based on the received information and provide the task object to the task execution engine. The task execution engine may execute the task object and, if the task is a synchronous task, generate a task completion event upon completion of the task. The task completion event may be provided to the state machine manager which may determine a state transition based on the task completion event and whether the task completed with or without an exception. The state machine manager may then transition to a next state in the state machine based on the determined state transition and may continue with the workflow execution as described above.

Example embodiments of the disclosure provide a number of technical features or technical effects. For example, in accordance with example embodiments of the disclosure, an on-device state machine-based architecture may be used to resume a workflow execution for a work item at a current execution state of the state machine at which the workflow execution was halted as a result of an on-device failure event. In addition, work item objects and the state of a work item queue containing work item object identifiers corresponding to the work item objects may be stored/updated in persistent data storage in response to various triggering events such as, for example, the creation of a new work item, the completion of a workflow execution for a work item, and the transition to a next state of a state machine as part of a workflow execution. In this manner, a workflow execution may continue from a point at which the execution left off after a failure condition created by a failure event is no longer present. It should be appreciated that the above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Embodiment

FIG. 1 is a schematic hybrid system, process, and data flow diagram illustrating execution of an example workflow for a purchase transaction using a persistent on-device state machine-based architecture in accordance with one or more example embodiments of the disclosure.

As shown in FIG. 1, a user 102 may utilize a client application 106 to provide user input 104 corresponding to a request to initiate a purchase transaction. The client application 106 may be, for example, a mobile web browser or dedicated mobile application executing on a mobile device. It should be appreciated, however, that the client application 106 may be any suitable application, program, or process executing on a user device. The user input 104 may correspond to, for example, selection by the user 102 of a user interface widget indicating a desire to initiate a purchase transaction for a physical good, a service, electronic content (e.g., video content, audio content, etc.), or the like.

Upon receipt of the user input 104, the client application 106 may make a call to a state machine manager 110 containing an instruction 108 to add a new purchase transaction (e.g., transaction N+1) to a work item queue. The illustrative embodiment depicted in FIG. 1 assumes that the state machine manager 110 has already been instantiated. If, however, an instance of the state machine manager 110 has not been created, the client application 106 may call a queue retrieval engine (shown in FIG. 2) which may, among other things, instantiate the state machine manager 110.

In certain example embodiments, the instruction 108 may include as parameters a work item object corresponding to the purchase transaction and a work item object identifier to be stored in association with the work item object. The work item object identifier may uniquely identify the work item object. In other example embodiments, the state machine manager 110 may generate the work item object and the corresponding work item object identifier for the purchase transaction. The state machine manager 110 may update 112 a work item queue 114 stored in data storage 116 of the user device to include the received work item object identifier. In particular, the state machine manager 110 may add the work item object identifier (e.g., $ID_{N+1}$) to the work item queue 114. If the queue 114 is a FIFO queue, the work item object identifier may be added to a rear terminal position of the queue 114. While FIG. 1 depicts other work item object identifiers as being present in the queue 114, it should be appreciated that the work item object identifier $ID_{N+1}$ may be a first work item object identifier added to the queue 114. The data storage 116 may include persistent data storage and/or memory of the user device. Thus, the newly generated work item object identifier $ID_{N+1}$ may be added to a work item queue 114 stored in persistent data storage and a work item queue 114 stored in the memory.

The state machine manager 110 may store the newly generated work item object in the data storage 116 as well. The work item object may include an indication of a current execution state of a workflow for the purchase transaction and metadata associated execution of the workflow. Prior to initiation of the workflow for the purchase transaction, the current execution state may be an initial state of a state machine used to execute the workflow. The metadata may include, for example, a transaction object that may include data indicating a state transition along which the workflow execution should proceed from the current execution state, data obtained from user input provided to a client application, system-generated data such as a transaction identifier for the purchase transaction, and so forth.

The state machine manager 110 may store the work item object in the data storage 116 in accordance with a data model that may be specified by the client application 106. For example, the state machine manager 110 may store the work item object and the corresponding work item object identifier $ID_{N+1}$ as a key-value pair in which the work item object identifier is the key and the corresponding work item object is the associated value. The key-value pair may be stored in persistent data storage as well as in memory. The work item object may be stored as a serialized representation of a JAVA™ object and the work item object identifier may be stored as an alphanumeric character string.

The state machine manager 110 may initiate execution of a workflow for the purchase transaction represented by the work item object in response to an instruction received from the client application 106. In certain example embodiments, the state machine manager 110 may execute workflows for work items having corresponding work item object identifiers in the queue 114 in accordance with an order of operation associated with the queue 114. For example, if the queue 114 is a FIFO queue, the state machine manager 110 may first execute a workflow for the work item that corresponds to the work item object identifier located at a front terminal position of the queue 114 (e.g., the first work item object identifier added to the queue 114). Upon completion of the workflow for the work item corresponding to the first work item object identifier added to the queue 114, the state machine manager 110 may dequeue the first work item object identifier and initiate execution of a workflow for the work item that corresponds to the next work item object identifier added to the queue 114 (which has now become the first work item object identifier in the queue 114). The state machine manager 110 may continue to serially execute workflows for work items in accordance with the order in which corresponding work item object identifiers were added to the queue 114. In other example embodiments, the state machine manager 110 may execute workflows for different work items in parallel.

Prior to initiation of execution 120 of a workflow for a particular work item (e.g., the purchase transaction to which the work item object identifier $ID_{N+1}$ corresponds), the state machine manager 110 may send a build command to a state machine builder (shown in FIG. 2) to generate a state machine 122 to be used in executing the workflow. The state machine builder may generate the state machine 122 in accordance with a state machine definition specified by the client application 106. The state machine manager 110 may then initiate execution 120 of the workflow using the state machine 122.

The state machine 122 may include a plurality of states 124, 128, 130, 132, and 134. An initial state 124 of the state machine 122 may correspond to processes that are executed to determine whether a default payment preference is associated with a user account of the user 102. At state 124, the state machine manager 110 may determine a task object factory (shown in FIG. 2) for generating a task object to be executed in connection with state 124. The task object factory may receive the work item object identifier and the transaction object (which is stored in the work item object) as input and may generate a corresponding task object. The task object may represent one or more tasks to be performed to determine whether a default payment preference is associated with the user account which may include, for example, one or more server calls to one or more back-end servers.

The task object factory may provide the task object to a task execution engine 118 which may execute the task object. The task execution engine 118 may be a thread pool executor that executes the task object on a new thread. Upon completion of the task represented by the task object, the task execution engine 118 may generate a task completion event indicating completion of the task and a function defined on an interface of the task execution engine 118 may be called to indicate whether the task completed with or without an exception. For example, a send function may be called if the task completed without an exception and a sendException function may be called if the task completed with an exception. Each of these functions may receive the task completion event and the work item object identifier as parameters. Calling the send or the sendException function may cause the task completion event and the work item object identifier to be reported to the client application 106 which may, in turn, call an executeAction function to pass the task completion event, the work item object identifier, and an indication as to whether the task completed with or without an exception to the state machine manager 110.

If the task executed by the task execution engine 118 at state 124 completed without generating an exception, this may indicate that a default payment preference is associated with the user account. The default payment preference may be, for example, credit card information that has been designated as a preferred form of payment for transactions associated with the user account. Accordingly, the state machine manager 110 may follow state transition 126B to transition the workflow from state 124 to state 130 in which one or more tasks for generating an order for the purchase transaction may be executed. On the other hand, if the task executed by the task execution engine 118 at state 124 completed with an exception, this may indicate that a default payment preference has not been associated with the user account. Accordingly, the state machine manager 110 may follow state transition 126A and may transition the workflow from state 124 to state 128.

At state 128, the task execution engine 118 may execute one or more tasks associated with obtaining payment information for the purchase transaction. More specifically, the state machine manager 110 may determine a task object factory to select for generating a task object representative of a task to be performed in connection with state 128. The task object factory may receive the work item object identifier and the transaction object as input and may generate the corresponding task object. The task object factory may provide the task object to the task execution engine 118 which may execute the task object to cause a user interface element (e.g., a widget) to be launched via which a desired form of payment may be selected by the user 102. Launching of the widget may be an asynchronous task for which the task execution engine 118 may not generate a task completion event. Instead, the task completion event may be generated after user input representing the selected payment preference is received via the widget and a save action is performed by the user 102 to allow the payment preference to be captured. Alternatively, a task completion event may be generated if the widget is closed prior to capturing the payment preference.

Upon receipt of the task completion event, the state machine manager 110 may transition the workflow from state 128 to state 130 if a payment preference is successfully captured. The task execution engine 118 may then execute one or more tasks associated with state 130 in order to cause an order to be generated for the purchase transaction. If, on the other hand, a payment preference was not successfully captured at state 128, the widget for receiving the payment preference may again be launched. Upon execution of task(s) associated with state 130 to create an order, a payment transaction may be executed using the specified payment preference, and the state machine manager 110 may transition the workflow from state 130 to state 134. State 134 may be a final state of the state machine 122 indicating that the purchase transaction is complete. Upon reaching state 134, the state machine manager 110 may dequeue the work item object identifier corresponding to the completed purchase transaction from the work item queue 114. In addition, the state machine manager 110 may delete the work item object corresponding to the completed purchase transaction from the data storage 116. The work item object identifier may be dequeued from the queue 114 stored in persistent data storage and the queue 114 stored in memory. Similarly, the work item object may be deleted from both persistent data storage and from memory.

In certain example embodiments, the workflow may transition from state 130 to an intermediate state 132 upon successful completion of the task(s) associated with state 130. For example, if the user 102, at state 128, elected to pay for the purchase transaction using an account associated with a third party payment processor, the workflow may transition from state 130 to 132 in which task(s) executed by the task execution engine 118 may include launching an application associated with the third party payment processor. The user 102 may then provide user input to the third party payment processor application corresponding to confirmation and authorization of the purchase transaction. One or more server calls may be made to a server associated with the third party payment processor to complete the payment authorization. A task completion event may then be generated and communicated to the state machine manager 110. Upon receipt of the task completion event, the state machine manager may transition the workflow to the final state 134.

Whenever a state transition occurs from a current execution state of the state machine 122 to a next state, the state machine manager 110 may update the work item object stored in the persistent data storage and the work item object stored in memory. Updating the work item object may include storing the next state as the now current execution state and updating the transaction object to include data obtained as a result of execution of task(s) associated with the prior state.

Illustrative State Machine-Based Architecture and Operation

Figure 2:
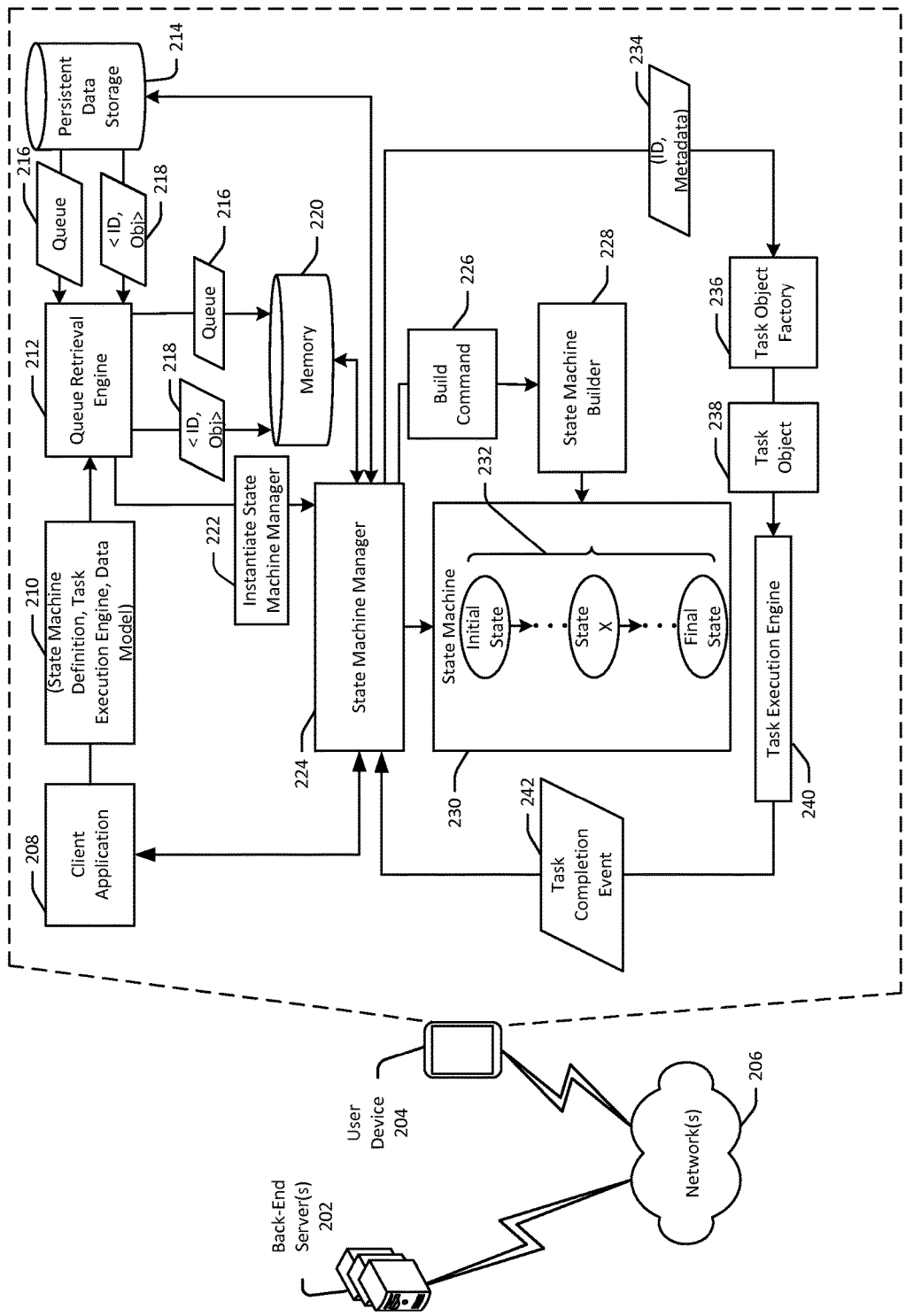
FIG. 2 is a schematic hybrid system, process, and data flow diagram illustrating execution of a workflow using a persistent on-device state machine-based architecture in accordance with one or more example embodiments of the disclosure.

FIG. 2 is a schematic hybrid system, process, and data flow diagram illustrating execution of a workflow using a persistent on-device state machine-based architecture in accordance with one or more example embodiments of the disclosure. The state machine-based architecture may be provided on a user device 204. The user device 204 may include, without limitation, a smartphone, a tablet, a wearable computing device, a personal digital assistant, a desktop computer, a laptop computer, or any other suitable user device.

The user device 204 may be configured to communicate with one or more back-end servers 202 via one or more networks 206. For example, the user device 204 may make one or more server calls to the back-end server(s) 202 via the network(s) 206 as part of the execution of various tasks in connection with the execution of a workflow for a work item. The network(s) 206 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 206 may have any suitable communication range associated therewith and may include, for example, global networks (e.g., the Internet), metropolitan area networks (MANs), wide area networks (WANs), local area networks (LANs), or personal area networks (PANs). In addition, the network(s) 206 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

A client application 208 may be executable on the user device 204. The client application 208 may, in certain example embodiments, correspond to the client application 104 and may include any of the types of applications previously described. Prior to initiation of a workflow for a work item, a queue retrieval engine 212 may be instantiated. The client application 208 may then make a function call to the queue retrieval engine 212. The client application 208 may pass various parameters to the called function including a state machine definition that defines the states and state transitions of a state machine to be used in executing a workflow for a work item, an interface for a task execution engine configured to execute various tasks in connection with the various states of the state machine, and a data model that specifies how work item objects and corresponding work item object identifiers are stored on-device.

In response to the function call, the queue retrieval engine 212 may access a work item queue 216 stored in persistent data storage 214 of the user device 204 and load the work item queue 216 into device memory 220. In addition, the queue retrieval engine 212 may also utilize the first work item object identifier included in the queue 216 (if the queue 216 is a FIFO queue) and the data model to locate and retrieve a key-value pair 218 from the persistent data storage 214 and store the key-value pair 218 in the memory 220. The key-value pair 218 may include the work item object identifier and the corresponding work item object. In certain example embodiments, the work item object may be stored in the persistent data storage 214 as a serialized representation (e.g., a character string) of a corresponding data object (e.g., a JAVA™ object). The queue retrieval engine 212 may also instantiate 222 a state machine manager 224. The client application 208 may interact with the state machine manager 224 to execute workflows for work items.

It should be appreciated that in certain example embodiments the queue 216 may be empty, in which case, the client application 208 may send an enqueue command to the state machine manager 224 (or the queue retrieval engine 212) instructing the state machine manager 224 (or the queue retrieval engine 212) to add a new work item object identifier to the queue 216 and to store the work item object identifier in association with a corresponding work item object as part of a key-value pair (e.g., the key-value pair 218).

Further, in certain example embodiments, the client application 208 may make the call to the queue retrieval engine 212 after a failure condition created by a failure event on the device 204 is no longer present. For example, execution of a workflow for a work item may halt due to the occurrence of a failure event. A failure event may include, for example, a crash event associated with the client application 208, a failure event on the user device 204 on which the client application 208 is executing that causes the client application 208 to cease functioning in an expected manner, a crash/reboot of the user device 204, and so forth. After a failure condition created by the occurrence of a failure event is no longer present (e.g., the client application 208 is launched again after crashing), the queue retrieval engine 212 may be instantiated and the client application 208 may call the queue retrieval engine 212 to initiate the process described above.

As previously noted, the queue retrieval engine 212 may create an instance of the state machine manager 224 and provide the instance of the state machine manager 224 (or an indication thereof) to the client application 208. In response to an instruction from the client application 208, the state machine manager 224 may initiate (or resume) execution of a workflow for a work item corresponding to, for example, a first work item object identifier that was added to the queue 216. In particular, the state machine manager 224 may send a build command 226 to a state machine builder 228 to construct a state machine 230 based on the state machine definition provided by the client application 208. The state machine definition may specify one or more states 232 for the state machine 230 and may further specify state transitions associated with each state.

The state machine manager 224 may also determine the current execution state stored in the work item object (which may be an initial state of the state machine 230 or the state at which the workflow execution was halted), and may initiate (or resume) the workflow execution at the current execution state. In particular, the state machine manager 224 may determine a task object factory 236 to select for generating a task object 238 for a task to be executed in connection with the current execution state, and may provide input 234 including the work item object identifier and metadata associated with the work item object to the task object factory 236. The task object factory 236 may instantiate the task object 238 based on the received information and provide the task object 238 to a task execution engine 240. The task execution engine 240 may execute the task object 238 and, if the task is a synchronous task, generate a task completion event 242 upon completion of the task. As previously described, a send function or a sendException function may be called upon completion of the task depending on whether the task completed with or without an exception. The task completion event 242 and the work item object identifier may be passed as parameters to the called function. The task completion event 242, the work object identifier, and an indication as to whether the task completed with or without an exception may be provided to the state machine manager 224 which may determine a state transition based at least in part on the task completion event 242 and based at least in part on whether the task completed with or without an exception. The state machine manager 224 may then transition to a next state in the state machine 230 based on the determined state transition and may continue with the workflow execution as described above.

Prior to transitioning to the next state in the state machine 230, the state machine manager 224 may update the stored work item object to indicate that the next state is the current execution state for the workflow and/or may update the metadata stored in the work item object. The work item object stored in the persistent data storage 214 and/or the work item object stored in the memory 220 may be updated. The state machine manager 224 may then determine a task object factory to select for generating a task object corresponding to a task to be completed in connection with the next state of the state machine 230 (which is now the current execution state). Upon determining the appropriate task object factory, the state machine manager 224 may provide the work item object identifier and work item object metadata to the task object factory to enable the task object factory to generate an appropriate task object. The workflow execution may then continue as described above.

While the device component that generates the state machine 230 in response to the build command 226 is described as the state machine builder 228 and the device component that generates the task object 238 is described as the task object factory 236, it should be appreciated that any suitable instantiator may be used to generate the state machine 230 and/or the task object 238. The state machine builder 228 and the task object factory 236 are merely example types of instantiators. Further, in certain example embodiments, the device component that generates the state machine 230 based on the state machine definition may be a factory and/or the device component that generates the task object 238 may be a builder. In addition, in certain example embodiments, a builder may have an immutability property. For example, a builder may be used to generate the state machine 230 in order to make the state machine 230 immutable.

Figure 3A:
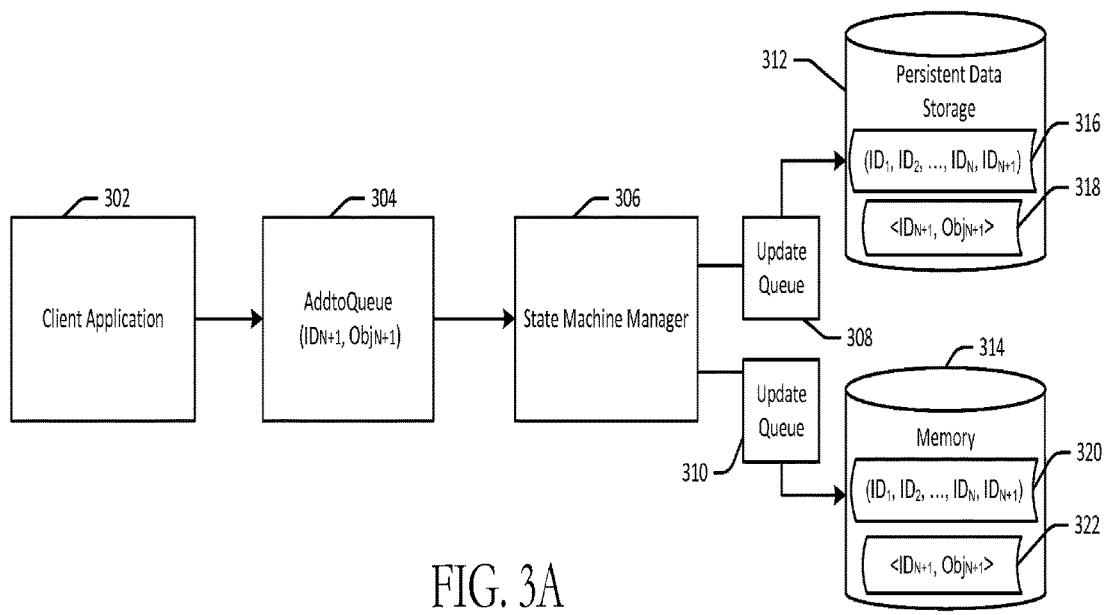
FIGS. 3A-3B are schematic hybrid system, process, and data flow diagrams illustrating example operations for adding and deleting work item objects and corresponding work item object identifiers from on-device persistent data storage and memory in accordance with one or more example embodiments of the disclosure.
Figure 3B:
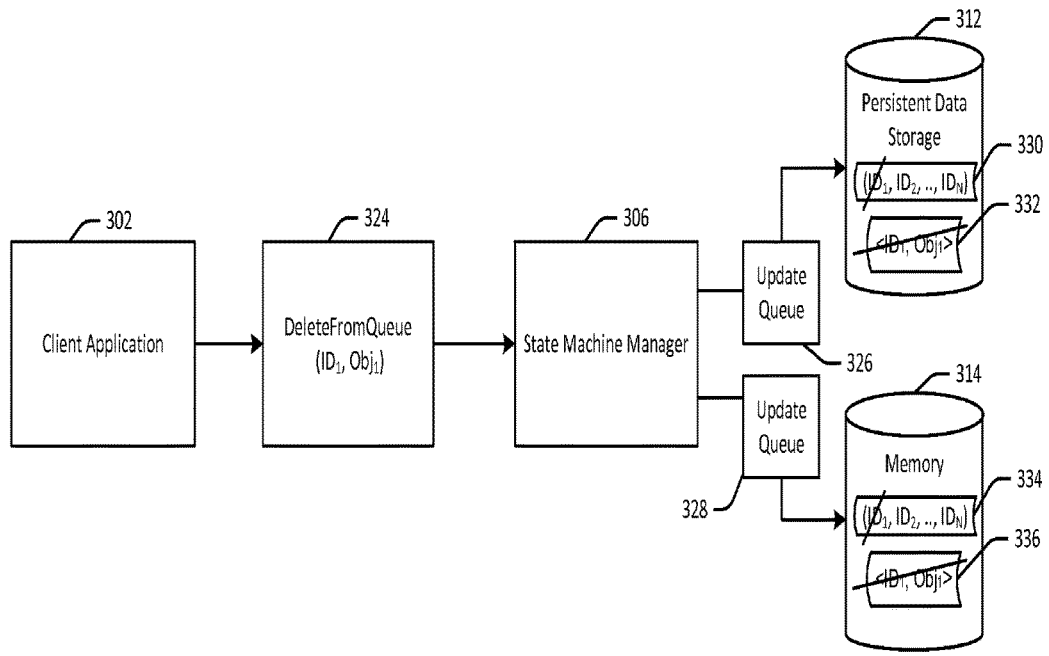

FIGS. 3A-3B are schematic hybrid system, process, and data flow diagrams illustrating example operations for adding and deleting work item objects and corresponding work item object identifiers from on-device persistent data storage and memory in accordance with one or more example embodiments of the disclosure. While certain operations may be described below as being performed by a state machine manager, it should be appreciated that other components (a queue retrieval engine) of a state machine-based architecture as described herein may instead perform such operations.

As shown in FIG. 3A, a client application 302 (which may correspond to any of the types of client applications previously described) may provide an enqueue command 304 to a state machine manager 306. The state machine manager 306 may correspond to the state machine manager 110 and/or the state machine manager 224. The enqueue command 304 may include as parameters a work item object representation of a new work item for which a workflow is to be executed as well as a work item object identifier corresponding to the work item object. The work item object may be specified as a serialized representation of a data object such as a JAVA™ object. In response to the enqueue command 304, the state machine manager 306 may perform a first set of one or more operations 308 to add the work item object identifier to a work item queue 316 stored in persistent data storage 312 of a user device on which the client application 302 is executing. In addition, the state machine manager 306 may store the work item object in association with the work item object identifier. The work item object and the corresponding work item object identifier may be stored in accordance with a data model specified by the client application 302. For example, the work item object and the work item object identifier may be stored as a key-value pair 318. In addition, in response to the enqueue command 304, the state machine manager 306 may also perform a second set of one or more operations 310 to add the work item object identifier to a work item queue 320 stored in memory 314 of the user device and to store the work item object and the work item object identifier as a key-value pair 322 in the memory 314 as well.

As shown in FIG. 3B, the client application 302 may also provide a dequeue command 324 to the state machine manager 306. The dequeue command 324 may include as parameters a work item object representation of a work item for which a workflow execution has been completed as well as a work item object identifier corresponding to the work item object. The work item object may be specified as a serialized representation of a data object such as a JAVA™ object. In response to the dequeue command 324, the state machine manager 306 may perform a third set of one or more operations 326 to remove the work item object identifier from a work item queue 330 stored in the persistent data storage 312. In addition, the state machine manager 306 may delete a key-value pair 332 containing the work item object and the work item object identifier. In addition, in response to the dequeue command 324, the state machine manager 306 may also perform a fourth set of one or more operations 328 to remove the work item object identifier from a work item queue 334 stored in the memory 314 and to remove a key-value pair 336 that contains the work item object and the work item object identifier from the memory 314 as well.

Figure 4:
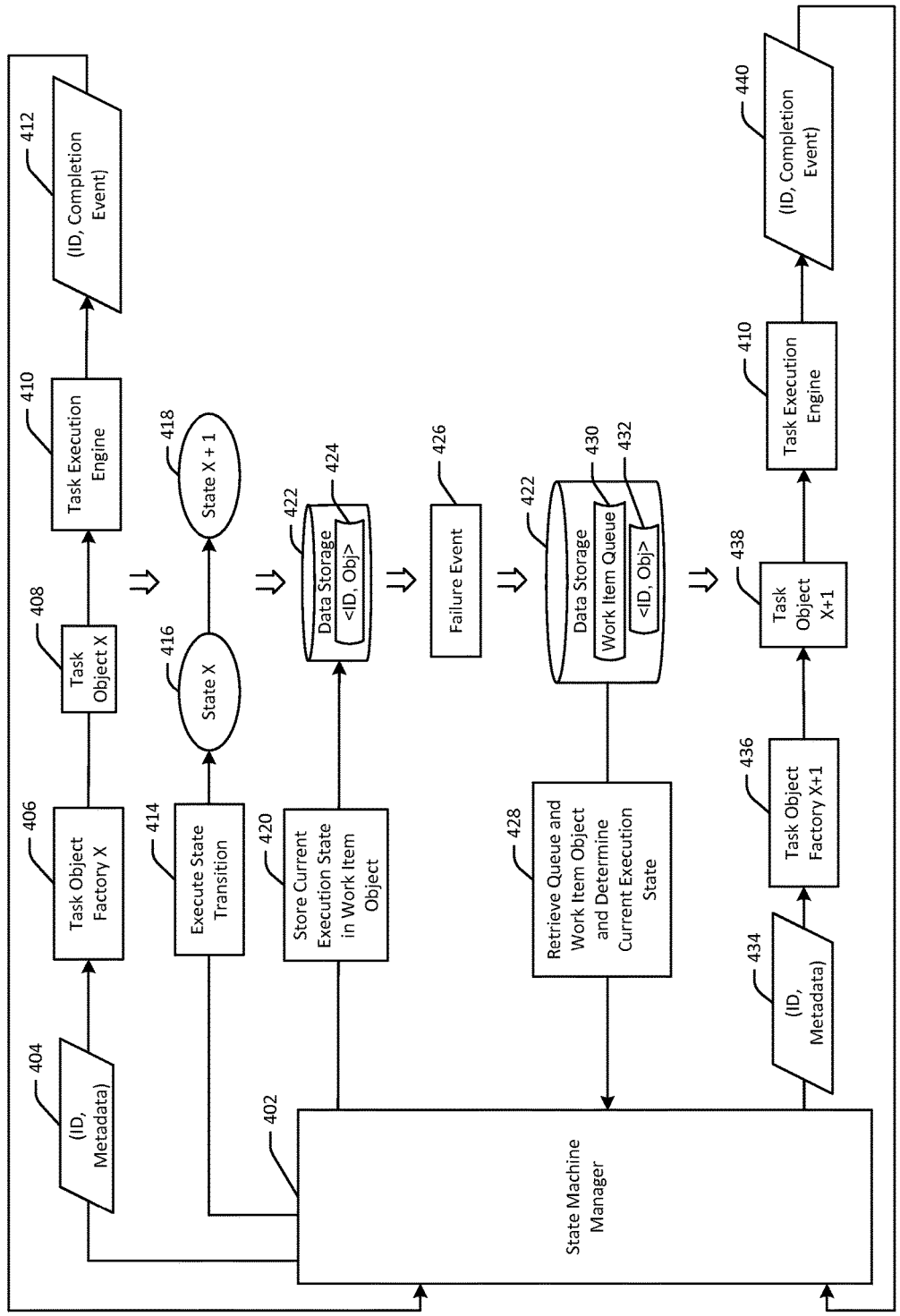
FIG. 4 is a schematic hybrid system, process, and data flow diagram illustrating a workflow execution that includes execution of a task corresponding to a current execution state of a state machine, transitioning to a next state in the state machine upon completion of the task, storing the next state as the current execution state in a stored work item object, halting the workflow execution in response to a failure event, and resuming the workflow execution at the current execution state after a failure condition created by the failure event is no longer present in accordance with one or more example embodiments of the disclosure.

FIG. 4 is a schematic hybrid system, process, and data flow diagram illustrating a workflow execution that includes execution of a task corresponding to a current execution state of a state machine, transitioning to a next state in the state machine upon completion of the task, storing the next state as the current execution state in a stored work item object, halting the workflow execution in response to a failure event, and resuming the workflow execution at the current execution state after a failure condition created by the failure event is no longer present in accordance with one or more example embodiments of the disclosure.

As previously described, as part of the execution of a workflow for a work item, a state machine manager 402 (which may correspond to the state machine manager 110, the state machine manager 224, and/or the state machine manager 306), may determine a task object factory 406 to select for generating a task object 408 for a task to be executed in connection with a current execution state of the workflow. The state machine manager 402 may provide the work item object identifier and metadata associated with the work item object (collectively 404) to the task object factory 406. The task object factory 406 may instantiate the task object 408 based on the received information 404 and provide the task object 408 to a task execution engine 410 (which may correspond to the task execution engine 118 and/or the task execution engine 242). The task execution engine 410 may execute the task object 408 and, if the task is a synchronous task, generate a task completion event 412 upon completion of the task. If the task is an asynchronous task, the task completion event 412 may be generated outside of the task execution engine 410.

As previously described, an interface for the task execution engine 410 may define functions that may be called upon completion of execution of the task 408. For example, a send function may be called when a task is completed without generating an exception and a sendException function may be called when an exception occurs during execution of a task. Depending on whether an exception occurs during execution of the task object 408, either the send function or the sendException function may be called. The function that is called may be passed the task completion event 412 generated upon completion of the task and the work item object identifier as parameters.

As a result of the function call, a client application may receive the task completion event 412 and the work item object identifier and forward this information to the state machine manager 402 along with an instruction to continue execution of the workflow based on the task having been completed. The instruction may include an indication of whether the task was completed with or without an exception. Upon receiving this instruction, the state machine manager 402 may determine the state transition that corresponds to completion of the task and transition 414 the workflow from the current execution state 416 to a next state 418 in the state machine based on the determined state transition. The state machine manager 402 may also update 420 the work item object stored in association with the work item object identifier as a key-value pair 424 in data storage 422 to indicate that the next state 418 is the current execution state for the workflow and/or may update the metadata stored in the work item object. The work item object stored in persistent data storage and/or the work item object stored in memory may be updated. Rather than receiving the task completion event 412 and the work item object identifier via the client application, in certain example embodiments, the state machine manager 402 may receive the task completion event 412 and the work item object identifier directly from the task execution engine 410.

In certain example embodiments, the workflow execution for the work item may then halt due to the occurrence of a failure event 426. The failure event 426 may be, for example, a crash event associated with a client application, a failure event on the user device on which the client application is executing, a crash/reboot of the user device, and so forth. After a failure condition created by the occurrence of the failure event 426 is no longer present (e.g., a client application is launched again after crashing), a queue retrieval engine may be instantiated. The client application may then make a call to the queue retrieval engine to access a work item queue 430 stored in the persistent data storage 422 and load the work item queue into device memory. In addition, the queue retrieval engine may determine a work item object identifier associated with the work item object whose workflow execution was halted (e.g., the first work item object identifier in the queue 430), and may use the work item object identifier to locate a key-value pair 432 that contains the corresponding work item object. The queue retrieval engine may then retrieve the work item object from the persistent data storage 422 and store the work item object in memory.

The queue retrieval engine may then create an instance of the state machine manager 402 and provide the instance of the state machine manager 402 (or an indication thereof) to the client application. The state machine manager 402 may then resume execution of the workflow for the work item corresponding to the retrieved work item object. In particular, the state machine manager 402 may instruct a state machine builder to construct a state machine based on a state machine definition provided by the client application. The state machine manager 402 may also determine the current execution state stored in the work item object (e.g., state X+1), which is the state at which the workflow was halted.

The state machine manager 402 may then determine a task object factory 436 to select for generating a task object 438 corresponding to a task to be completed in connection with the current execution state (e.g., state X+1). Upon determining the appropriate task object factory 436, the state machine manager 402 may provide the work item object identifier and work item object metadata (collectively 434) to the task object factory 436 to enable the task object factory 436 to generate an appropriate task object 438. In a similar manner as described above, the task object factory 436 may provide the task object 438 to the task execution engine 410 which may execute the task object 438 and, if the task is a synchronous task, generate a task completion event 440 upon completion of the task. The task completion event 440 and the work item object identifier may then be communicated to the state machine manager 402 (potentially via the client application) to enable the state machine manager 402 to transition the workflow to a next state of the state machine.

Illustrative Processes

Figure 5:
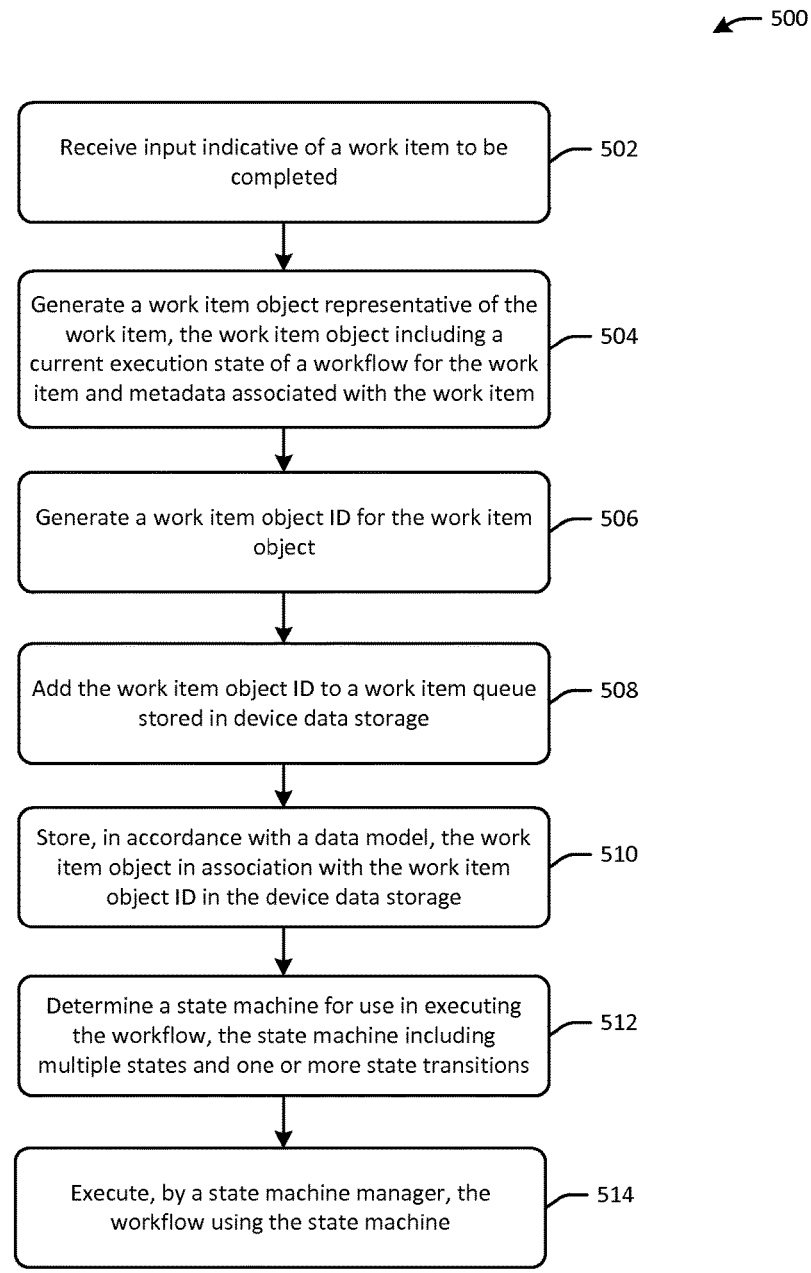
FIG. 5 is a process flow diagram of an illustrative method for generating a work item object representative of a work item to be completed, storing the work item object and a corresponding work item object identifier in on-device persistent data storage and memory, instantiating a state machine manager to execute a workflow associated with the work item, determining a state machine to use in executing the workflow, and causing the state machine manager to execute the workflow using the state machine in accordance with one or more example embodiments of the disclosure.

FIG. 5 is a process flow diagram of an illustrative method 500 for generating a work item object representative of a work item to be completed, storing the work item object and a corresponding work item object identifier in on-device persistent data storage and memory, instantiating a state machine manager to execute a workflow associated with the work item, determining a state machine to use in executing the workflow, and causing the state machine manager to execute the workflow using the state machine in accordance with one or more example embodiments of the disclosure.

At block 502, a client application may receive input indicative of a work item to be completed. In other example embodiments, a state machine manager (or a queue retrieval engine) may receive the input indicative of the work item to be completed from the client application and may proceed to perform the operations at blocks 504 and 506. In certain example embodiments, the work item may be a purchase transaction to be executed. However, it should be appreciated that the work item may be any suitable work item to be executed.

At block 504, the client application may generate a work item object representative of the work item. The work item object may include a current execution state of a workflow for the work item and metadata associated with the work item. Prior to initiation of execution of the workflow for the work item, the current execution state may be an initial state of the state machine based on which the workflow execution is to be performed. In certain example embodiments, the work item object may be specified as a serialized representation of a data object such as a JAVA™ object. At block 506, the client application may generate a work item object identifier (ID) for the work item object.

At block 508, the state machine manager may add the work item object ID to a work item queue stored in persistent data storage of a user device, and optionally, to a corresponding work item queue stored in memory of the user device. At block 510, the state machine manager may store the work item object in association with the work item object ID in the persistent data storage, and optionally, in the memory. The work item object and the work item object ID may be stored in accordance with a data model specified by the client application. For example, the work item object and the corresponding work item object ID may be stored as a key-value pair. The operations at blocks 508 and 510 may be performed in response to an enqueue command received by the state machine manager from the client application.

In response to an instruction to begin execution of a workflow for the work item, or in response to the work item object ID becoming the first ID in the work item queue as a result of a dequeuing of earlier work item object ID(s), the state machine manager may retrieve the serialized representation of the corresponding work item object from persistent data storage and load the retrieved serialized representation into memory. The stare machine manager may then generate the work item object from the serialized representation. At block 512, the state machine manager may determine a state machine for use in executing the workflow for the work item represented by the work item object. The state machine may be generated by a state machine builder in response to a build command from the state machine manager and in accordance with a state machine definition provided by the client application. The state machine may include multiple states as well as one or more state transitions for each state that indicate one or more next states that can be transitioned to from each state. At block 514, the state machine manager may initiate execution of the workflow using the state machine.

Figure 6:
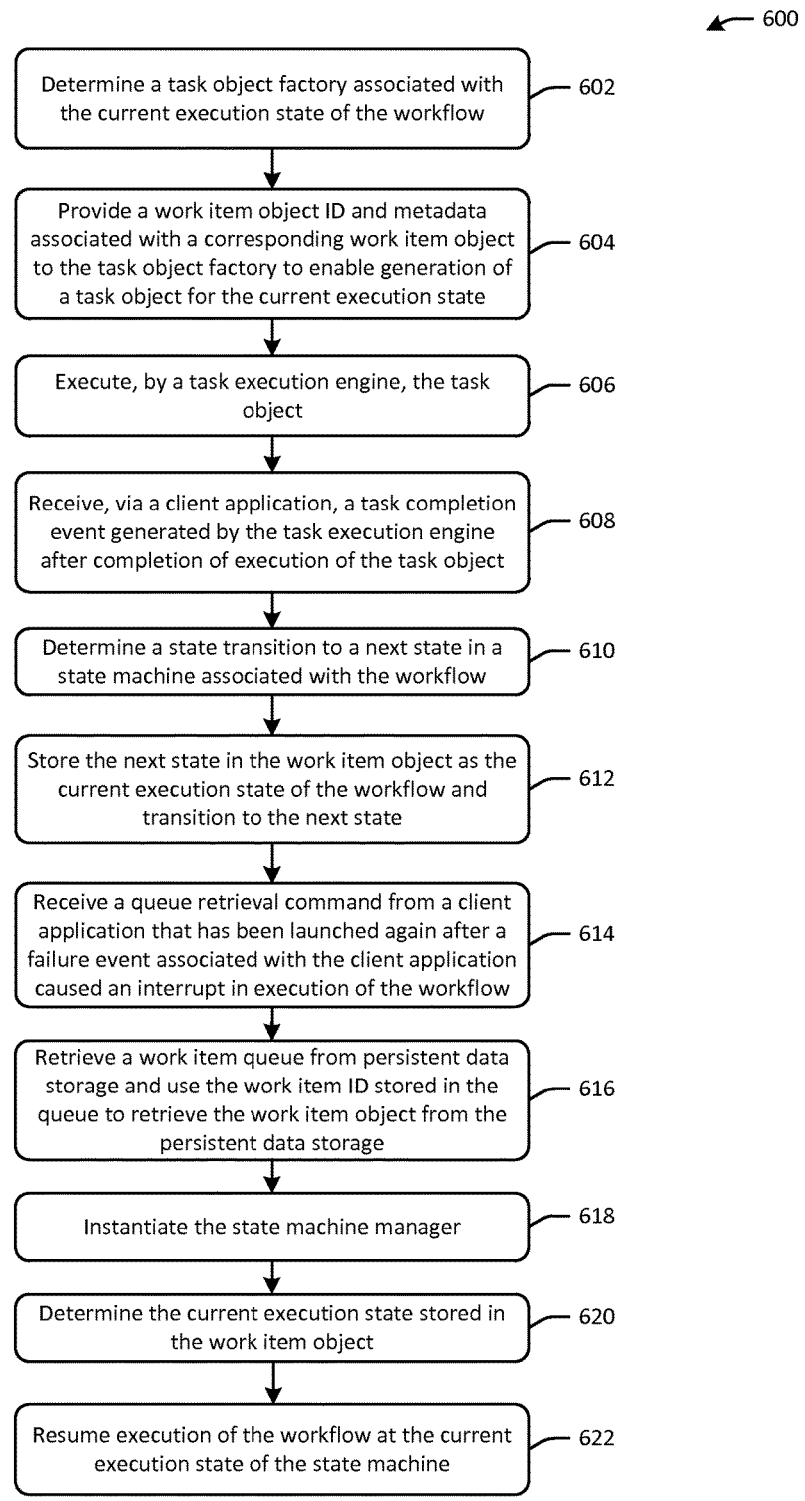
FIG. 6 is a process flow diagram of an illustrative method for performing a workflow execution that includes execution of a task corresponding to a current execution state of a state machine, transitioning to a next state in the state machine upon completion of the task, storing the next state as the current execution state in a stored work item object, and resuming the workflow execution at the current execution state after determining that a client application has been launched subsequent to a failure event associated with the client application that caused an interrupt in execution of the workflow in accordance with one or more example embodiments of the disclosure.

FIG. 6 is a process flow diagram of an illustrative method 600 for performing a workflow execution that includes execution of a task corresponding to a current execution state of a state machine, transitioning to a next state in the state machine upon completion of the task, storing the next state as the current execution state in a stored work item object, and resuming the workflow execution at the current execution state after determining that a client application has been launched subsequent to a failure event associated with the client application that caused an interrupt in execution of the workflow in accordance with one or more example embodiments of the disclosure. Various operations of the method 600 may be described as being performed by different components of a state machine-based architecture as described herein. It should be appreciated, however, that any operation described as being performed by a particular component may, in various example embodiments, be performed by one or more other components, in the alternative or in a distributed manner.

Execution of a workflow for a work item (as described in reference to operation 514 of FIG. 5) may include, at block 602, determination of a task object factory associated with a current execution state of the workflow. If the workflow is being initiated (and not resumed), the current execution state may be an initial state of a corresponding state machine.

At block 604, the state machine manager may provide a work object item ID and metadata associated with a corresponding work item object to the task object factory to enable generation of a task object for the current execution state. The task object factory may then provide the task object to a task execution engine which may execute the task object at block 606.

Upon completion of execution of the task object, the task execution engine may generate a task completion event indicative of completion of the task. If the task is an asynchronous task, the task completion event may be generated outside of the operational context of the task execution engine. An interface for the task execution engine may define a first function to be called if the task completes without generating an exception and a second function to be called if the task completes with an exception being generated. The task completion event and the work item object ID may be passed as parameters to either function. More specifically, a TaskExecutionListener interface may be passed in as a parameter upon instantiation of the task execution engine. After the task execution engine completes execution of the task object, an afterExecute function may be called on the task execution engine which may, in turn, cause a TaskExecutionListener object to be instantiated. Either the first function or the second function may then be called on the TaskExecutionListener object which may cause the task completion event and the work item object ID to be reported to a client application. The task completion event, the work item object ID, and an indication as to whether the task completed with or without an exception may then be received, via the client application, by the state machine manager at block 608. Alternatively, calling the first function or the second function on the TaskExecutionListener object may cause the task completion event and the work item object ID to be provided directly to the state machine manager.

At block 610, the state machine manager may determine a next state in a state machine associated with the workflow to transition to from the current execution state. In particular, the state machine manager may determine an appropriate state transition based on whether the task completed with or without an exception, determine the next state in the state machine that is associated with that state transition, and transition to the next state. Prior to transitioning to the next state, the state machine manager may, at block 612, update a stored work item object associated with the work item for which the workflow is being executed. In particular, the state machine manager may store the next state as the current execution state in the work item object and may update the metadata in the work item object to include data generated/obtained as a result of execution of the task at block 606. The state machine manager may then transition to the next state.

The execution of the workflow may then be halted due to a failure event. If the failure event is, for example, a crash of the client application, when the client application is once again launched, it may instantiate a queue retrieval engine and send a queue retrieval command to the queue retrieval engine, which may be received by the queue retrieval engine at block 614. In response to receipt of the queue retrieval command, the queue retrieval engine may, at block 616, retrieve a work item queue from persistent data storage and load the queue into memory. The queue retrieval engine may also use the work item object ID associated with the work item whose workflow execution was halted to retrieve the corresponding work item object from the persistent data storage. In certain example embodiments, a serialized representation of the work item object may be read from the persistent data storage and written to memory and the work item object may be constructed from the serialized representation. At block 618, the queue retrieval engine may instantiate the state machine manager.

At block 620, the state machine manager may determine a current execution state for the workflow. The current execution state may be stored in the work item object. At block 622, the state machine manager may resume execution of the workflow at the current execution state of the state machine.

Illustrative Device Architecture

Figure 7:
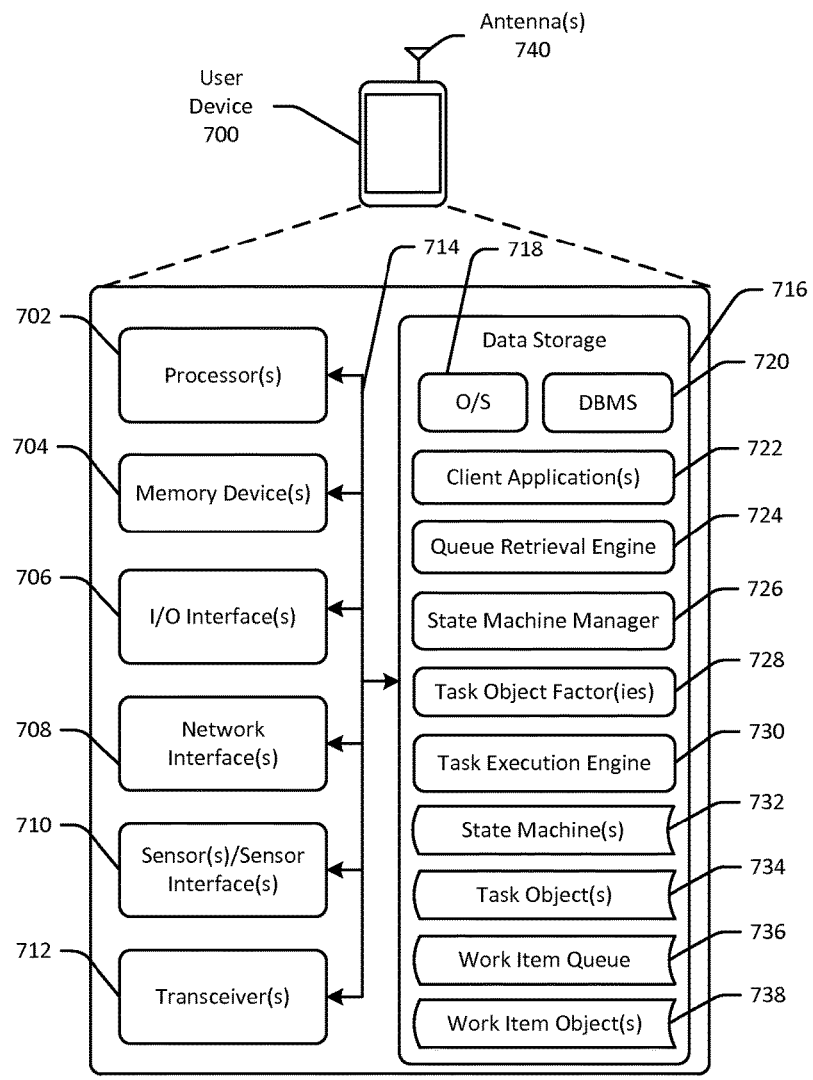
FIG. 7 is a schematic diagram of an illustrative device architecture in accordance with one or more example embodiments of the disclosure.

FIG. 7 is a schematic diagram of an illustrative device architecture in accordance with one or more example embodiments of the disclosure. The user device 700 may include any suitable computing device including, but not limited to, a mobile device such as a smartphone, tablet, e-reader, wearable device, or the like; a desktop computing device; a laptop computing device; and so forth. The user device 700 may correspond to an illustrative device configuration for the user device 204.

In an illustrative configuration, the device 700 may include one or more processors (processor(s)) 702, one or more memory devices 704 (generically referred to herein as memory 704), one or more input/output ("I/O") interface(s) 706, one or more network interfaces 708, one or more sensors or sensor interfaces 710, one or more transceivers 712, and data storage 716. The device 700 may further include one or more buses 714 that functionally couple various components of the device 700. The device 700 may further include one or more antennas 740 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 714 may include at least one of a system bus, a memory bus, an address bus, or a message bus, and may permit exchange of information (e.g., data (including computer-executable code), signaling, etc.) between various components of the device 700. The bus(es) 714 may include, without limitation, a memory bus or a memory controller, a peripheral bus, an accelerated graphics port, and so forth. The bus(es) 714 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the device 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 716 may include removable storage and/or non-removable storage including, but not limited to, magnetic storage, optical disk storage, and/or tape storage. Persistent data storage, as that term is used herein, may include any of the types of data storage 716 mentioned above. The data storage 716 may provide non-volatile storage of computer-executable instructions and other data. The memory 704 and the data storage 716, removable and/or non-removable, are examples of computer-readable storage media (CRSM) as that term is used herein.

The data storage 716 may store computer-executable code, instructions, or the like that may be loadable into the memory 704 and executable by the processor(s) 702 to cause the processor(s) 702 to perform or initiate various operations. The data storage 716 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 716 for non-volatile storage.

More specifically, the data storage 716 may store one or more operating systems (O/S) 718; one or more database management systems (DBMS) 720; and one or more program modules, applications, engines, or the like such as, for example, one or more client applications 722, a queue retrieval engine 724, a state machine manager 726, one or more task object factory(ies) 728, a task execution engine 730, and so forth. These program modules, applications, engines, or the like may be configured to perform operations described earlier in this application in connection with corresponding components. Any of the program modules, applications, engines, or the like depicted in FIG. 7 may include any combination of software, firmware, and/or hardware. The software and/or firmware may include computer-executable code, instructions, or the like that may be loaded into the memory 704 for execution by one or more of the processor(s) 702. The data storage 716 may further store various types of data including one or more state machines 732, one or more task objects 734, a work item queue 736 containing zero or more work item object identifiers, and one or more work item objects 738. Any data stored in the data storage 716 may be loaded into the memory 704 for use by the processor(s) 702 in executing computer-executable code. In addition, any data depicted as being stored in the data storage 716 may potentially be stored in one or more datastores (not shown in FIG. 7) and may be accessed via the DBMS 720 and loaded in the memory 704 for use by the processor(s) 702 in executing computer-executable code. Such datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 702 may be configured to access the memory 704 and execute computer-executable instructions loaded therein. For example, the processor(s) 702 may be configured to execute computer-executable instructions of the various program modules, applications, engines, or the like of the user device 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to other illustrative components depicted as being stored in the data storage 716, the O/S 718 may be loaded from the data storage 716 into the memory 704 and may provide an interface between other application software executing on the device 700 and hardware resources of the device 700. More specifically, the O/S 718 may include a set of computer-executable instructions for managing hardware resources of the device 700 and for providing common services to other application programs (e.g., managing memory allocation among various application programs). In certain example embodiments, the O/S 718 may control execution of one or more of the program modules depicted as being stored in the data storage 716. The O/S 718 may include any operating system now known or which may be developed in the future including, but not limited to, any server operating system, any mainframe operating system, or any other proprietary or non-proprietary operating system.

The DBMS 720 may be loaded into the memory 704 and may support functionality for accessing, retrieving, storing, and/or manipulating data stored in the memory 704 and/or data stored in the data storage 716. The DBMS 720 may use any of a variety of database models (e.g., relational model, object model, etc.) and may support any of a variety of query languages. The DBMS 720 may access data represented in one or more data schemas and stored in any suitable data repository. In those example embodiments in which the device 700 is a mobile device, the DBMS 720 may be any suitable light-weight DBMS optimized for performance on a mobile device.

Referring now to other illustrative components of the device 700, the input/output (I/O) interface(s) 706 may facilitate the receipt of input information by the device 700 from one or more I/O devices as well as the output of information from the device 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(s) 740 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The device 700 may further include one or more network interfaces 708 via which the device 700 may communicate with any of a variety of other systems, platforms, networks, devices, and so forth. The network interface(s) 708 may enable communication, for example, with the back-end server(s) 202 via the network(s) 206.

The antenna(s) 740 may include any suitable type of antenna depending, for example, on the communications protocols used to transmit or receive signals via the antenna(s) 740. Non-limiting examples of suitable antennas may include directional antennas, non-directional antennas, dipole antennas, folded dipole antennas, patch antennas, multiple-input multiple-output (MIMO) antennas, or the like. The antenna(s) 740 may be communicatively coupled to one or more transceivers 712 or radio components to which or from which signals may be transmitted or received.

As previously described, the antenna(s) 740 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 740 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the antenna(s) 740 may be configured to transmit or receive radio frequency signals within any suitable frequency range forming part of the unlicensed portion of the radio spectrum.

The antenna(s) 740 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 740—transmitting or receiving radio frequency (RF) signals in the bandwidth and/or channels corresponding to the communications protocols utilized by the device 700 to communicate with other devices. The transceiver(s) 712 may include hardware, software, and/or firmware for modulating, transmitting, or receiving—potentially in cooperation with any of antenna(s) 740—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the device 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program modules, applications, computer-executable instructions, code, or the like depicted in FIG. 7 as being stored in the data storage 716 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the device 700, and/or hosted on other computing device(s) accessible via one or more networks, may be provided to support functionality provided by the program modules, applications, or computer-executable code depicted in FIG. 7 and/or additional or alternate functionality. Further, functionality may be modularized differently such that processing described as being supported collectively by the collection of program modules depicted in FIG. 7 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 7 may be implemented, at least partially, in hardware and/or firmware across any number of devices.

It should further be appreciated that the device 700 may include alternate and/or additional hardware, software, or firmware components beyond those described or depicted without departing from the scope of the disclosure. More particularly, it should be appreciated that software, firmware, or hardware components depicted as forming part of the device 700 are merely illustrative and that some components may not be present or additional components may be provided in various embodiments. While various illustrative program modules have been depicted and described as software modules stored in data storage 716, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the methods 500 or 600 may be performed by a device having the illustrative configuration depicted in FIG. 7, or more specifically, by one or more engines, program modules, applications, or the like executable on such a device. It should be appreciated, however, that such operations may be implemented in connection with numerous other device configurations.

The operations described and depicted in the illustrative methods of FIGS. 5 and 6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 5 and 6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
   receiving, by a user device, data associated with a user input indicating a request to initiate a data transaction associated with a user account;
   generating a work item object representative of the data transaction, the work item object comprising a current state of a workflow for the data transaction and a transaction identifier associated with the data transaction;
   associating a work item object identifier with the work item object;
   adding the work item object identifier to a first work item queue stored in persistent data storage of the user device;
   adding the work item object identifier to a second work item queue stored in memory of the user device;
   storing the work item object in the persistent data storage and in the memory;
   instantiating a state machine manager to execute the workflow for the data transaction;
   determining a state machine, wherein determining the state machine comprises:
      determining a first state corresponding to a default user preference being associated with the user account;
      determining a second state corresponding to a user selection of a user preference for the data transaction; and
      determining a third state corresponding to completion of the data transaction; and
   executing, by the state machine manager, the workflow for the data transaction by transitioning through the state machine to obtain an execution result associated with the user account, wherein executing the workflow comprises:
      executing a first task associated with the first state of the state machine;
      generating a task completion event associated with execution of the first task, the task completion event indicating that the default user preference is not associated with the user account;
      determining a state transition using the task completion event, wherein determining the state transition comprises determining that the second state is a next state of the state machine to transition to from the first state;
      storing the second state as the current state of the workflow in the work item object stored in the persistent data storage and in the memory; and
      executing a second task associated with the current state of the workflow.

2. The method of claim 1, wherein the state transition is a first state transition, and wherein executing the second task comprises:
   launching an application program that enables the user selection of the user preference for the data transaction;
   receiving the user preference via the application program;
   closing the application program;
   generating a second task completion event associated with execution of the second task, the second task completion event indicating that the user preference has been received;
   determining a second state transition using the second task completion event, wherein the second state transition indicates that the third state is the next state of the state machine to transition to from the second state;
   storing the third state as the current state of the workflow in the work item object stored in the persistent data storage and in the memory; and
   executing a third task associated with the current state of the workflow.

3. The method of claim 1, further comprising:
   determining that a client application program has been launched after a failure event associated with the client application program causes an interrupt in execution of the workflow;
   retrieving the first work item queue from the persistent data storage;
   storing the first work item queue as a third work item queue in the memory;
   retrieving the work item object from the persistent data storage using the work item object identifier;
   storing the work item object in association with the work item object identifier in the memory;
   re-instantiating the state machine manager;
   determining the current state of the workflow from the work item object; and
   resuming, by the state machine manager, execution of the workflow at the current state of the workflow.

4. A method, comprising:
   generating a work item object representative of a work item, generating the work item object comprising associating a current execution state of a workflow with the work item and generating metadata associated with the work item;
   associating a work item object identifier with the work item object;
   storing the work item object identifier in a work item queue;
   determining a state machine comprising a plurality of states associated with execution of the workflow;
   executing the workflow using the state machine;
   determining that execution of a first task associated with a first state has been completed;
   determining that an exception occurred during execution of the first task;
   executing a function call to notify a client application program executing on a particular device that the exception occurred during execution of the first task;
   receiving, an instruction to continue executing the workflow, wherein the instruction comprises an indication that the exception occurred during execution of the first task, a task completion event, and the work item object identifier, and wherein a state transition is determined from the indication that the exception occurred during execution of the first task; and executing a second task associated with a second state.

5. The method of claim 4, wherein executing the workflow comprises:
   determining that a current execution state of the workflow is the first state of the plurality of states;
   executing the first task associated with the first state;
   generating the task completion event, wherein the task completion event indicates that execution of the first task has completed;
   determining a state transition for the workflow, wherein the state transition indicates the second state of the plurality of states to transition to, from the first state;
   storing the second state as a new current execution state of the workflow in the work item object; and
   transitioning to the second state.

6. The method of claim 5, further comprising storing the work item queue in persistent data storage, wherein storing the work item object identifier in the work item queue comprises associating the work item object identifier with the work item queue stored in the persistent data storage.

7. The method of claim 6, further comprising:
   determining that a failure condition that caused execution of the workflow to halt is no longer present;
   receiving the work item queue from the persistent data storage;
   storing the work item queue in memory;
   receiving the work item object from the persistent data storage using the work item object identifier;
   storing the work item object in association with the work item object identifier in the memory;
   determining the current execution state of the workflow from the work item object; and
   resuming execution of the workflow at the new current execution state.

8. The method of claim 5, further comprising:
   determining a task object factory associated with the first state;
   sending the work item object identifier to the task object factory;
   sending the metadata to the task object factory; and
   receiving, from the task object factory, a task object associated with the first state,
   wherein executing the task comprises executing the task object using a task execution engine.

9. The method of claim 5, wherein a task execution engine executes the first task, the method further comprising:
   instantiating a state machine manager to execute the workflow using the state machine;
   determining, by the task execution engine, that a third task was completed without generating an exception;
   executing, by the task execution engine, the function call to notify the client application program executing on a user device that the third task was completed without generating the exception, wherein executing the function call comprises providing a task completion event and a work item object identifier associated with the third task as parameters to the function call;
   receiving an instruction to continue executing the workflow, wherein the instruction comprises an indication that the third task was completed without generating the exception, the task completion event associated with the third task, and the work item object identifier associated with the third task, and wherein the state transition is determined from the indication that the third task was completed without generating the exception; and
   executing, by the task execution engine, a fourth task associated with a forth state.

10. The method of claim 5, wherein executing the function call comprises providing the task completion event and the work item object identifier as parameters to the function call, wherein a task execution engine executes the first task, the method further comprising
    instantiating a state machine manager to execute the workflow using the state machine, wherein the second task is executed by the task execution engine.

11. The method of claim 5, wherein the task completion event is a first task completion event, the method further comprising:
    generating a second task completion event indicating that execution of the second task has been completed;
    receiving the second task completion event and an indication that execution of the second task has been completed without generating an exception;
    determining that the second state is a final state in the state machine;
    deleting the work item object identifier from the work item queue; and
    deleting the work item object.

12. The method of claim 5, wherein executing the second task comprises launching an application program via a client application program executing on the user device and the task completion event is a first task completion event, the method further comprising:
    receiving first user input;
    instantiating a state machine manager to execute the workflow using the state machine;
    receiving second user input via the application program; and
    sending a second task completion event to the state machine manager asynchronously from execution of the second task by the task execution engine.

13. A device, comprising:
    at least one memory storing computer-executable instructions; and
    at least one processor operatively coupled to the at least one memory and configured to access the at least one memory and execute the computer-executable instructions to:
    generate a work item object representative of a work item, generating the work item object comprising associating a current execution state of a workflow with the work item and generating metadata associated with the work item;
    associate a work item object identifier with the work item object;
    store the work item object identifier in a work item queue;
    determine a state machine comprising a plurality of states associated with execution of the workflow;
    execute the workflow using the state machine
    determine that execution of a first task associated with a first state has been completed;
    determine that an exception occurred during execution of the first task;
    execute a function call to notify a client application program executing on a particular device that the exception occurred during execution of the first task;
    receive an instruction to continue executing the workflow, wherein the instruction comprises an indication that the exception occurred during execution of the first task, a task completion event, and the work item object identifier, and wherein a state transition is determined from the indication that the exception occurred during execution of the first task; and execute a second task associated with a second state.

14. The device of claim 13, wherein the at least one processor is configured to execute the workflow using the state machine by executing the computer-executable instructions to:

determine that a current execution state of the workflow is the first state of the plurality of states;

execute the first task associated with the first state;

generate the task completion event, wherein the task completion event indicates that execution of the first task has been completed;

determine a state transition for the workflow, wherein the state transition indicates the second state of the plurality of states to transition to from the first state;

store the second state as a new current execution state of the workflow in the work item object; and transition to the second state.

15. The device of claim 14, wherein the at least one processor is further configured to execute the computer-executable instructions to store the work item queue in persistent data storage, and wherein the at least one processor is configured to store the work item object identifier in the work item queue by executing the computer-executable instructions to associate the work item object identifier with the work item queue stored in the persistent data storage.

16. The device of claim 15, wherein the at least one processor is further configured to execute the computer-executable instructions to:

determine that a failure condition that caused execution of the workflow to halt is no longer present;

receive the work item queue from the persistent data storage;

store the work item queue in the at least one memory;

receive the work item object from the persistent data storage using the work item object identifier;

store the work item object in association with the work item object identifier in the at least one memory;

determine the current execution state from the work item object; and resume execution of the workflow at the current execution state.

17. The device of claim 14, wherein the at least one processor is further configured to execute the computer-executable instructions to:

determine a task object factory associated with the first state;

send the work item object identifier to the task object factory;

send the metadata to the task object factory; and receive, from the task object factory, a task object associated with the first state, wherein the at least one processor is configured to execute the task by executing the computer-executable instructions of a task execution engine to cause the task object to be executed.

18. The device of claim 14, wherein the at least one processor is further configured to execute the computer-executable instructions to:

determine that a third task was completed without generating an exception;

execute the function call to notify the client application program executing on a user device that the third task was completed without generating the exception, wherein executing the function call comprises providing a task completion event and a work item object identifier associated with the third task as parameters to the function call;

receive, an instruction to continue executing the workflow, wherein the instruction comprises an indication that the third task was completed without generating the exception, the task completion event associated with the third task, and the work item object identifier associated with the third task, and wherein the state transition is determined from the indication that the third task was completed without generating the exception; and execute a fourth task associated with a forth state.

19. The device of claim 14, wherein executing the function call comprises providing the task completion event and the work item object identifier as parameters to the function call.

20. The device of claim 14, wherein the task completion event is a first task completion event, wherein the at least one processor is further configured to execute the computer-executable instructions to:

generate a second task completion event indicating that execution of the second task has been completed;

receive the second task completion event and an indication that execution of the second task has been completed without generating an exception;

determine that the second state is a final state in the state machine;

delete the work item object identifier from the work item queue; and delete the work item object.

* * * * *